United States Patent Office 3,063,957
Patented Nov. 13, 1962

3,063,957
PROCESS FOR DISPERSING RECLAIMED SILICONE RUBBER IN A SILICONE GUM
Paul Evans Kochis, Fairfield, Conn., assignor to E. I. du Pont de Nemours and Company, Wilmington, Del., a corporation of Delaware
No Drawing. Filed Sept. 15, 1959, Ser. No. 840,028
5 Claims. (Cl. 260—37)

This invention relates to a process and, more particularly, to a process for dispersing reclaimed silicone rubber in silicone gum.

Because it has a combination of properties including, for example, excellent resistance to high and low temperatures, excellent resistance to ozone and excellent electrical properties, silicone rubber has found wide use in recent years. Necessarily, the increased use of silicone rubber has provided increasing quantities of silicone rubber scrap including flash, trimmings, rejects and the like. Such scrap silicone rubber, which usually has been compounded with fillers and the like and vulcanized, is conventionally reclaimed, that is, reprocessed so that it can be used again. Normally, such reclaiming includes, for example, milling the scrap between closely spaced rolls warmed to about 100–150° F. until the scrap forms into a continuous, though usually grainy sheet. Preferably, and conventionally, the scrap is autoclaved in steam prior to the aforementioned milling step. Such reclaiming at least partially depolymerizes the silicone rubber in the compounded and vulcanized scrap and makes it possible to rework, refabricate and recure the scrap.

Reclaimed silicone rubber is usually blended with silicone gum, that is, virgin silicone rubber, then compounded, fabricated and vulcanized. However, considerable difficulty has been encountered in blending reclaimed silicone rubber with silicone gum, particularly when the reclaimed silicone rubber has been compounded with a large portion of filler and where the resulting stock is to be fabricated into supported and unsupported sheets and films. To blend reclaimed silicone rubber with silicone gum requires prolonged milling. Also, for example, when reclaimed silicone rubber which has been compounded with large portions of filler is blended with silicone gum, compounded and then calendered into sheets by conventional methods, the resulting sheets contain discrete areas of undispersed reclaimed silicone rubber ranging in size, for example, from a few mils to an inch or more in diameter. Also, during the calendering, splits and cracks, sometimes extending entirely through the sheets, form adjacent to the aforementioned discrete areas of undispersed reclaimed silicone rubber.

I have found a method for uniformly blending reclaimed silicone rubber with silicone gum which eliminates the aforementioned processing problems.

The process of this invention comprises milling 100 parts by weight of a blend of silicone gum and reclaimed silicone rubber in the presence of at least about 0.5 parts by weight of at least one alcohol boiling below about 400° F. Although up to about 50% by weight of reclaimed silicone rubber based on the total weight of silicone rubber (i.e., reclaimed silicone rubber and silicone gum) can be used, blends containing about from 10 to 35% by weight of reclaimed silicone rubber are preferred.

Any of the conventional silicone gums and the reclaimed rubbers derived therefrom can be processed according to this invention. Such silicone gums and rubbers are poly(organosiloxanes) containing the recurring structural unit:

wherein R and R' represent organic radicals, usually hydrocarbon radicals. Typical substituents represented by R and R' include, for example, alkyl, alkenyl, aryl, alkaryl, aralkyl, cycloalkyl and halogenated aryl radicals such as methyl, ethyl, vinyl, penyl, tolyl, benzyl, cyclohexyl and chlorophenyl radicals. Alkyl-vinyl silicone rubbers, that is, silicone rubbers in which R and R' represent alkyl and vinyl radicals, respectively, and particularly methyl-vinyl silicone rubbers containing about from 0.001 to 0.03 vinyl radicals per methyl radical are preferred.

The reclaimed silicone rubber is preferably worked on a cold mill, that is, a mill cooled to a temperature below about 120° F., for about from 1 to 10 minutes. Any of the conventional water-cooled rubber mills, other conventional milling equipment such as Banbury mixers or even calender rolls can be used in this and the subsequent steps. The silicone gum is next added to the mill and blended with the reclaimed silicone rubber for about from 5 to 30 minutes. Alternately, the reclaimed silicone rubber and silicone gum can be added to the mill simultaneously and milled for about the same period. Blends containing at least 5% of reclaimed silicone rubber based on the total weight of silicone rubber are usually used.

Fillers are usually milled into the aforementioned silicone rubber blend; however, alternately, they can be added to the mill simultaneously with the silicone gum. The fillers are milled into the silicone rubber, usually on a cold mill, until a uniform dispersion thereof is obtained. Typical fillers are, for example, hydrated silica; barium and cadmium titanates, zirconates and stannates; diatomaceous earth; clays; calcium carbonate; finely ground quartz; barites; iron oxide; zinc oxide; titanium dioxide and mixtures thereof. Up to 500 parts of filler per 100 parts by weight of silicone rubber (including both the reclaimed silicone rubber and silicone gum) can be used. Conventionally, as the amount of filler is increased, particularly above 100 parts of filler per 100 parts by weight of silicone rubber, and especially with non-reinforcing fillers such as the aforementioned titanates, clays, diatomaceous earth and the like, it becomes increasingly difficult to fabricate thin articles of the resulting stock. This problem is accentuated when the reclaimed silicone rubber used therein also was originally compounded with such large portions of filler. With the process of this invention, this problem is obviated. With the process of this invention, stocks containing well over 100 parts of filler per 100 parts by weight of silicone rubber can be easily fabricated into thin articles such as sheet materials, even when the reclaimed silicone rubber used therefor has been compounded with such large portions of filler.

Usually curing agents for the silicone rubber are added after the filler is added. However, the curing agents can be added with the filler or before the filler provided the mill is kept sufficiently cool, usually below 120° F., so that the rubber does not cure on the mill. Examples of curing agents are 2,4-dichlorobenzoyl peroxide, di-(tertiarybutyl)perbenzoate, tertiarybutyl perbenzoate, benzoyl peroxide and dicumyl peroxide. As is well known in the art, the amount of curing agent varies with the particular curing agent, silicone gum and reclaimed silicone rubber used and the weight ratio of gum to reclaimed silicone rubber. Usually, however, about from 0.5 to 15 and preferably 1.0 to 3.0 parts of curing agent per 100 parts by weight of silicone rubber are used. The catalyst is milled with silicone rubber stock until it is thoroughly mixed therewith. Usually, this takes about from 5 to 30 minutes.

The resulting rubber stock prepared as described above is next usually aged for about from 1 to 10 days to allow sufficient time for the rubber to wet the filler, then at least about 0.5, and preferably about from 1.0 to 2.0 parts, per 100 parts by weight of silicone rubber, of at least one alcohol boiling below about 400° F. is milled therewith. The alcohol is normally milled with the stock for about from 5 to 60 minutes, and preferably 10 to 30 minutes at a temperature below about 120° F. The longer milling times are usually required with stocks containing large amounts of filler or reclaimed silicone rubber. Examples of alcohols which can be used are methanol, ethanol, propanol-1, propanol-2, butanol-1, 2-methyl propanol-1, pentanol-1, 2-methyl pentanol-1, ethylene glycol, propanediol-1,2, 2-methyl propandiol-1,3, and mixtures thereof. Alcohols boiling between about 150° and 200° F. are preferred because they can be removed easily from the rubber stock, yet do not evaporate too readily so that large excesses thereof must be used to insure thorough blending of the silicone gum and reclaimed rubber. Ethanol is particularly preferred because it is very effective in small proportions, can be removed easily from the rubber stock and is readily available.

During the milling with the alcohol, the reclaimed silicone rubber is thoroughly dispersed in the other components of the stock. Sufficient milling time should be allowed to permit substantially all of the alcohol to evaporate; otherwise, during subsequent curing or vulcanization pits or holes are formed in the fabricated products by the evaporation of the alcohol. With alcohols boiling below about 200° F. such as ethanol, the aforementioned preferred milling period of 10 to 30 minutes coupled with subsequent aging and calendering is sufficient to allow evaporation of substantially all of the alcohol. With the higher boiling alcohols such as ethylene glycol, with lower boiling alcohols such as ethanol when milling periods of less than about 10 minutes are used or when large excesses, for example 10 or more parts of alcohol per 100 parts of silicone rubber, are used, this removal is facilitated by heating the mill to a temperature of up to about 400° F., at least during the latter part of the alcohol-milling step. If the mill is heated during the alcohol-milling step, the curing agent is added to the rubber stock after the alcohol is milled therewith to prevent the silicone rubber blend from curing on the mill.

Although only preferred compounding procedures are described hereinbefore, various modifications in the aforementioned procedures can be made without departing from the scope of this invention. Thus, for example, known activators, accelerators, antioxidants, softeners and inhibitors for silicone rubbers can be incorporated in the forementioned blends.

The alcohol-milled stock described above is preferably aged for about from 10 to 30 hours, then fabricated and cured. If sheets or films of the product are to be formed, the stock is normally calendered in the conventional manner usually between rolls held below about 120° F. The product can also be fabricated by molding, extruding and other known procedures.

Any of the conventional curing procedures can be used for products produced in accordance with this invention. One preferred procedure comprises press curing the fabricated articles for about 1 to 20 minutes at about 340° to 240° F. at pressures usually ranging from 10 to 500 p.s.i., then heating the resulting products at atmospheric pressure for about from 1 to 24 hours at 500 to 300° F. The products also can be cured, for example, at atmospheric pressure at temperatures ranging from about 500 to 300° F. for about from 1 to 24 hours or molded and cured simultaneously in heated molds.

The process of this invention greatly facilitates the milling and fabrication of all blends of reclaimed silicone rubber and silicone gum. It is particularly useful in preparing blends of silicone gum with reclaimed silicone rubber wherein the blend, the reclaimed silicone rubber used therein or both are compounded with high loadings of nonreinforcing fillers. Heretofore such blends could not be satisfactorily formed, for example, into smooth, crack-free sheets and films.

The silicone rubber stock prepared in accordance with this invention can be calendered into sheets and films useful, for example, as insulation and dielectric heat-sealing blankets; extruded into tubing or molded into gaskets, diaphragms or any of a wide variety of other molded objects.

The folowing examples are intended to illustrate the invention and not to limit it in any way. Parts and percentages are by weight unless otherwise specified.

*Example 1*

Four parts of reclaimed silicone rubber compounded with about 14 parts of barium titanate filler are milled for 5 minutes on a standard two-roll, differential-speed rubber mill. The mill rolls are set tight (e.g., about ¼ inch roll spacing) and are water cooled to maintain the temperature of the rubber below about 120° F. Next, 12.5 parts of silicone gum are added thereto and blended on the cold mill for about 5 to 10 minutes, then 44.5 parts of barium titanate filler are thoroughly miled therewith. 0.40 part of benzoyl peroxide curing agent dispersed in 0.4 part of silicone oil "Ludox" AGE) is then added thereto and milled for 10 minutes. The resulting product prepared as described above contains about 350 parts of barium titanate filler and 2.4 parts of curing agent per 100 parts by weight of silicone gum and reclaimed silicone rubber. The virgin silicone rubber, that is, the silicone gum, and the silicone rubber from which the reclaimed silicone rubber is derived, are poly(methyl-vinyl siloxanes) having a Williams Plasticity number (A.S.T.M. D-926-47T, room temperature, 3 minutes) of 115 to 170, a specific gravity of 0.98 and about $2.5 \times 10^{-3}$ vinyl substituents per methyl substituent. Poly(organosiloxanes) of this type are sold by General Electric Company under the designation Silicone Rubber SE-33.

The rubber stock described above is next aged about six days to give the polymer time to wet the filler and then put back on the cold mill and milled with 0.25 part of ethanol (1.6 parts of ethanol per 100 parts of silicone rubber). After the alcohol and rubber stock have been milled for about 20 minutes, the composition is aged for about 24 hours, then calendered at a thickness of about 64 mils onto a carrier sheet of parachute nylon fabric. Dried mica is applied to the exposed surface of the sheet to reduce surface tackiness. The sheet material is then sandwiched between two sheets of clay-coated kraft paper and the assembly is pressed at a pressure of about 18 p.s.i. for 10 minutes between platens heated to 275° F. The release paper and nylon fabric are then stripped from the pressed sheet of silicone rubber which is then suspended in an oven and air cured at a temperature of 480° F. for four hours. The resulting product is smooth, uniform, free from cracks and splits and shows no areas of undispersed reclaimed silicone rubber. This product is useful, for example, as a dielectric heat-sealing blanket in laminating thermoplastic sheet materials to backing sheets.

The procedure described above is repeated except that the alcohol milling step is omitted. The resulting product is uneven and lumpy, shows areas of undispersed reclaimed silicone rubber varying in size from several mils to an inch or more in diameter and has many splits and cracks running therethrough.

Other fillers such as mixtures of barium titanate, barium zirconate and barium stannate; clays; diatomaceous earth and titanium dioxide can be substituted in equal amounts for the filler used in this example to yield smooth crack-free sheets and films with no areas of undispersed reclaimed silicone rubber. Similarly, other silicone gums and reclaimed rubbers derived therefrom can be advantageously milled with alcohol as described in this example. Examples of such gums are poly(dimethyl siloxanes) such as "Silastic" 400 and 401 Gums (proprietary products of the Dow Corning Corporation); poly(methylphenyl siloxanes) such as "Silastic" 440 Gum and poly(organosiloxanes) such as those described in U.S. Patent No. 2,867,599. Of course, the particular curing agents, fillers and curing procedures used with each of the aforementioned poly(organosiloxanes) will vary in accordance with known compounding and curing practices and depending on the proposed use of the products.

*Example 2*

A mixture of 4 parts of reclaimed silicone rubber compounded with 14 parts of barium titanate filler, 12.5 parts of silicone gum and 44.5 parts of barium titanate filler is prepared from the materials and by the procedure described in Example 1. The blend is next milled at a temperature of 300° F. for 30 minutes with 0.3 part of ethylene glycol. The mill is then cooled to below 120° F. and 0.8 part of the benzoyl peroxide dispersion described in Example 1 is milled therewith for 10 minutes. The resulting composition is aged six days at room temperature, then calendered and cured as described in Example 1. The resulting product is smooth and uniform and shows no cracks or areas of undispersed reclaimed rubber.

I claim:
1. A process which comprises milling 100 parts by weight of a blend of silicone gum and reclaimed silicone rubber in the presence of at least about 0.5 part by weight of at least one alcohol boiling below about 400° F., said blend containing up to about 50% by weight of reclaimed silicone rubber and removing alcohol from the resulting blend during said milling, each of said silicone gum and silicone rubber being a poly(organosiloxane) having the recurring structural unit

wherein R and R' are selected from the group consisting of hydrocarbon and chlorophenyl radicals.

2. A process which comprises milling up to 500 parts by weight of filler and 100 parts by weight of a blend of silicone gum and reclaimed silicone rubber in the presence of about from 1.0 to 2.0 parts by weight of at least one alcohol boiling between about 150 and 200° F., said blend containing about from 10 to 35% by weight of reclaimed silicone rubber and removing alcohol from the resulting blend during said milling, each of said silicone gum and silicone rubber being a poly(organosiloxane) having the recurring structural unit

wherein R and R' are selected from the group consisting of hydrocarbon and chlorophenyl radicals.

3. A process which comprises adding about from 1.0 to 2.0 parts by weight of ethanol to a mixture of about from 100 to 500 parts by weight of non-reinforcing filler and a blend of silicone gum and reclaimed silicone rubber, said blend containing about from 10 to 35% by weight of reclaimed silicone rubber, and milling the resulting composition for about from 5 to 60 minutes and removing ethanol from the resulting blend during said milling, each of said silicone gum and silicone rubber being a poly(organosiloxane) having the recurring structural unit

wherein R and R' are selected from the group consisting of hydrocarbon and chlorophenyl radicals.

4. A process which comprises milling reclaimed silicone rubber compounded with about from 100 to 500 parts by weight of non-reinforcing filler per 100 parts by weight of reclaimed silicone rubber, milling therewith silicone gum and additional non-reinforcing filler to yield a composition containing 100 to 500 parts by weight of filler and 100 parts by weight of a blend of silicone gum and reclaimed silicone rubber, said blend containing 10 to 35% by weight of reclaimed silicone rubber, adding about from 1.0 to 2.0 parts of ethanol thereto and milling the resulting composition for about from 10 to 30 minutes and removing ethanol from the resulting blend during said milling, each of said silicone gum and silicone rubber being a poly(organosiloxane) having the recurring structural unit

wherein R and R' are selected from the group consisting of hydrocarbon and chlorophenyl radicals.

5. The process of claim 1 in which substantially all the alcohol is removed from said blend during said milling.

References Cited in the file of this patent
UNITED STATES PATENTS

| | | |
|---|---|---|
| 2,666,035 | Pfeifer | Jan. 12, 1954 |
| 2,673,843 | Humphrey et al. | Mar. 30, 1954 |
| 2,852,484 | New | Sept. 16, 1958 |